United States Patent [19]
McGovern, Jr. et al.

[11] 3,780,843
[45] Dec. 25, 1973

[54] VARIABLE-LENGTH CONVEYOR
[75] Inventors: Harold Joseph McGovern, Jr., Metairie; Louis Albert Granja, New Orleans, both of La.
[73] Assignee: United Brands Company, Boston, Mass.
[22] Filed: July 7, 1972
[21] Appl. No.: 269,729

[52] U.S. Cl. .......................................... 193/35 TE
[51] Int. Cl. ............................................ B65g 13/00
[58] Field of Search ...................... 193/35 TE, 35 F, 193/35 J; 198/183

[56] References Cited
UNITED STATES PATENTS
2,105,142  1/1938  Forsythe ....................... 193/35 TE FOREIGN PATENTS OR APPLICATIONS
1,112,561  11/1955  France ........................... 193/35 TE

*Primary Examiner*—Evon C. Blunk
*Assistant Examiner*—H. S. Lane
*Attorney*—Rowland V. Patrick

[57]  ABSTRACT

This invention relates to conveyors and more particularly to a variable-length conveyor adapted to extend different distances as, for example, from a dock into a docked trailer so that articles being loaded into the trailer can be delivered at the output end of the conveyor at any point along the length of the trailer interior from the front to the rear as loading proceeds.

8 Claims, 6 Drawing Figures

PATENTED DEC 25 1973 3,780,843
SHEET 1 OF 2
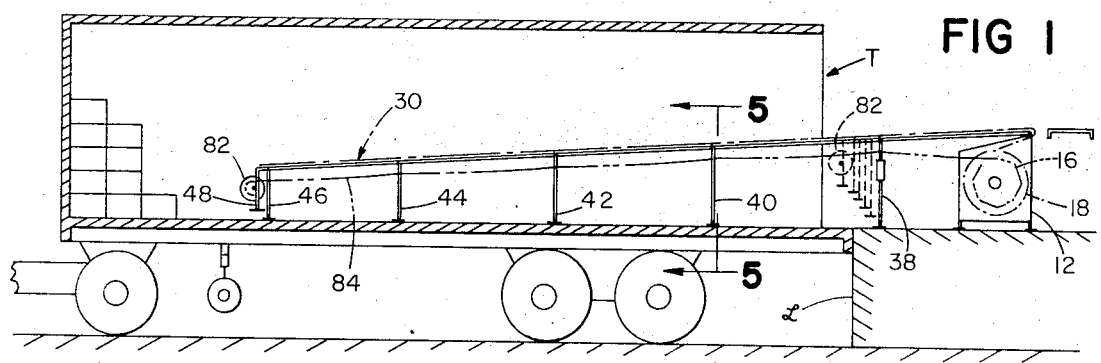
FIG 1
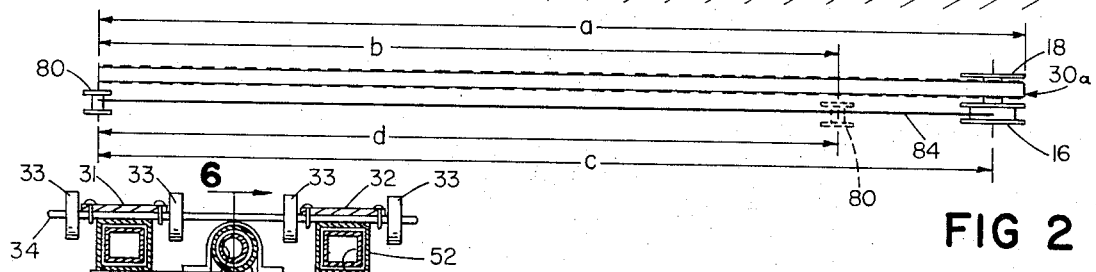
FIG 2
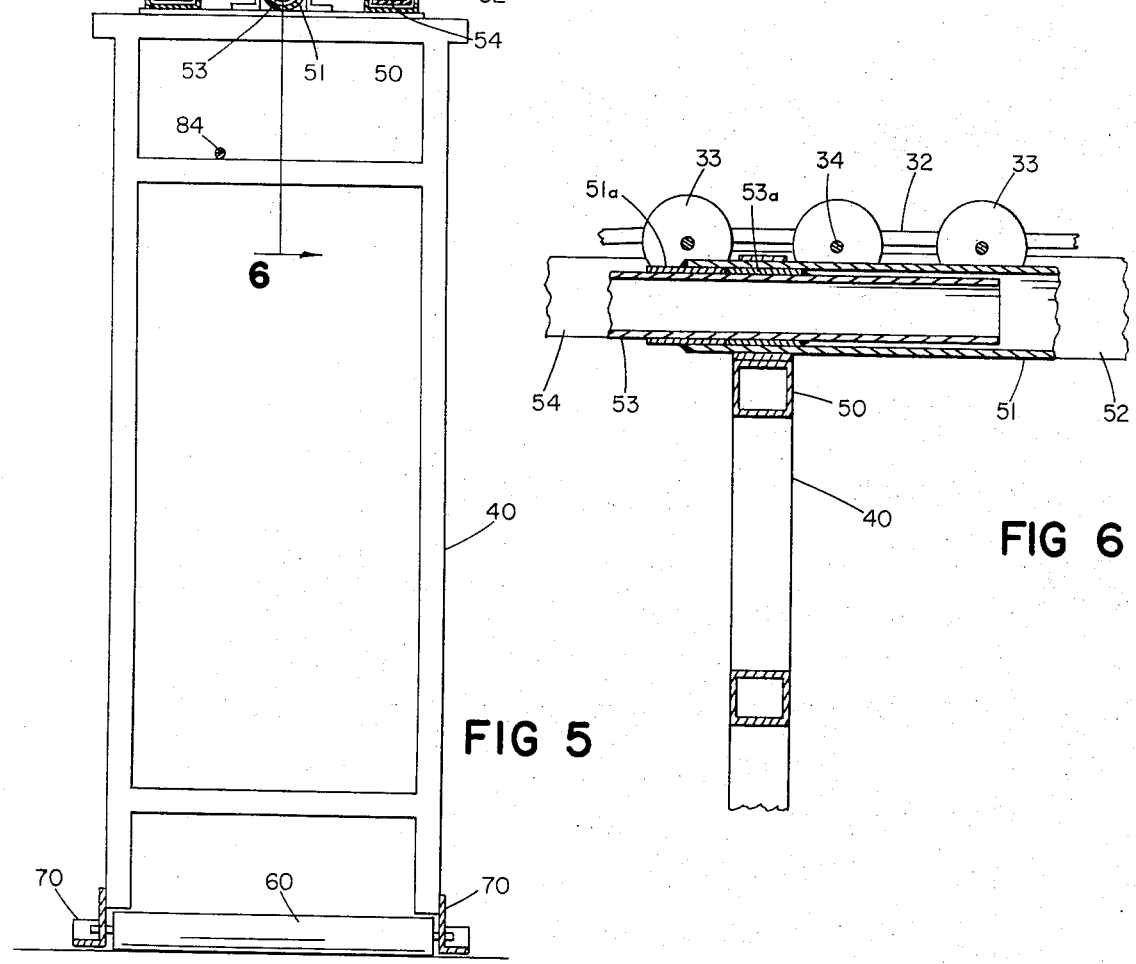
FIG 5
FIG 6

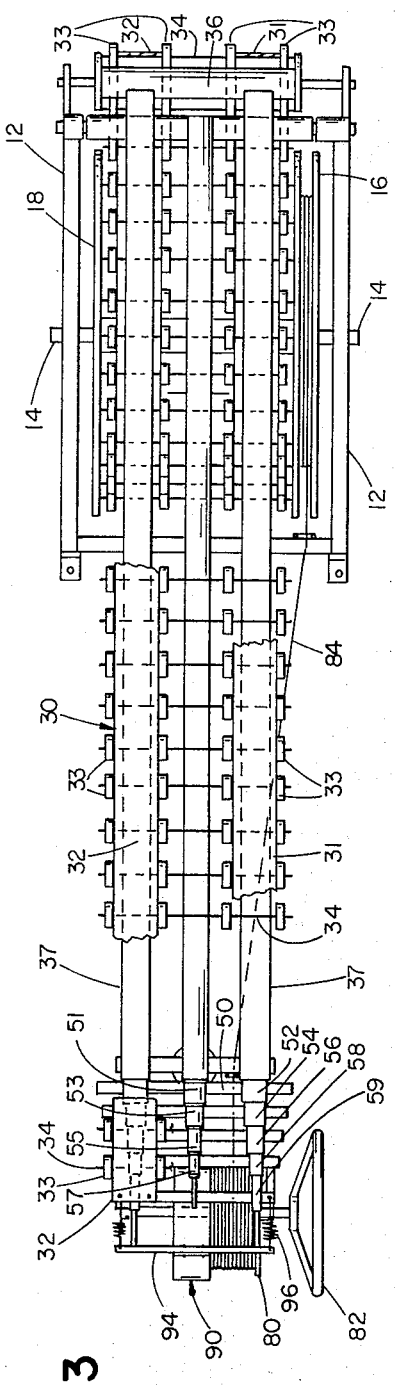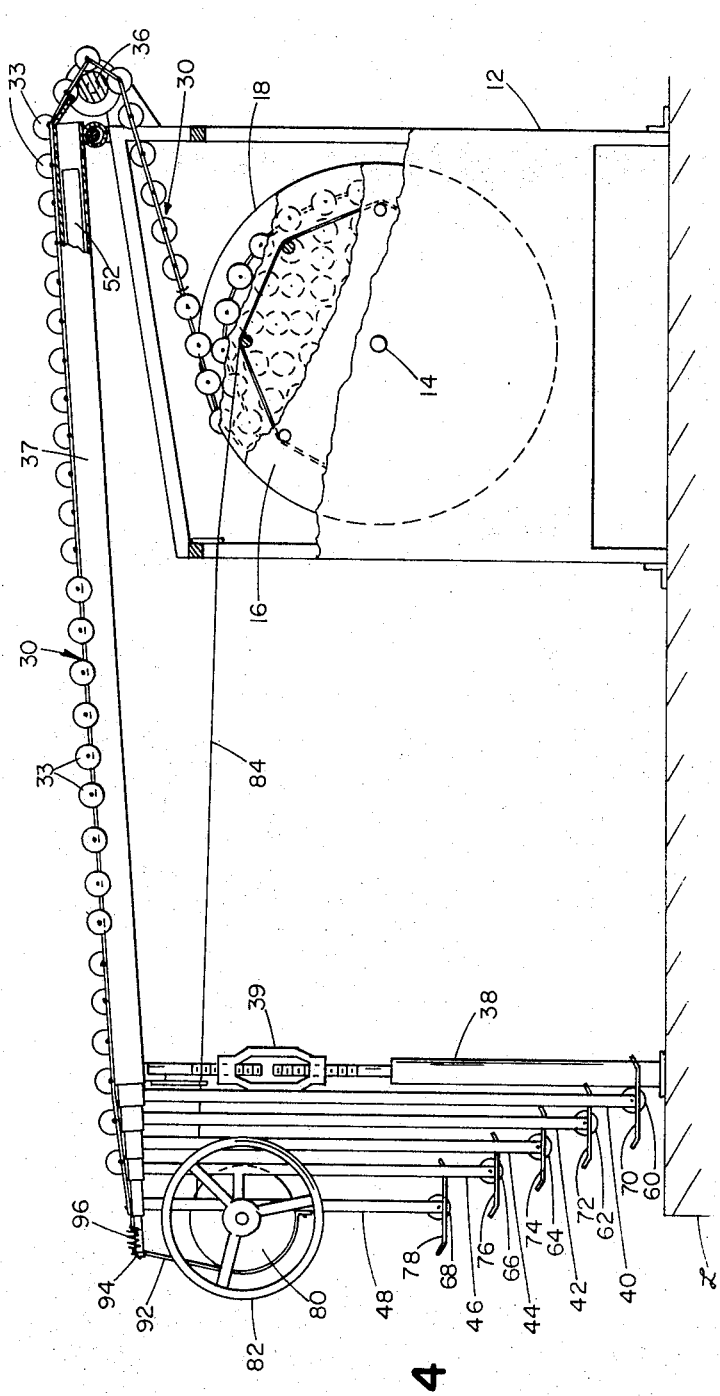

3,780,843

VARIABLE-LENGTH CONVEYOR

BACKGROUND OF THE INVENTION

While present-day trailer loading may involve the use of gravity conveyors which are placed end-to-end to deliver boxes through the open rear door of the trailer, the units making up the conveyor have to be moved separately and by hand and the loading has to stop to change the location of the internal end of the conveyor as loading proceeds and to rearrange the units so that gravity flow can proceed again.

The main object of this invention is to provide a conveyor which is of variable length and which can be installed permanently on a truck dock with one end of the conveyor ready to be moved through the open rear door of a docked trailer to a position anywhere within the length of the interior of the trailer, while making the structure light in weight and easily handled. In fact, the device may be positioned and retracted by one operator. In addition, it provides a uniformly inclined conveyor plane without steps of the sort now common between gravity conveyor sections.

SUMMARY OF THE INVENTION

To this end, the operation of retracting the conveyor back onto the dock after it has been fully or partially extended into the trailer is controlled by hand manipulation of a wheel and reel which is always located at the free end of the conveyor, from which end the unloading operator can control the shortening of the conveyor, inactive portions of which are wound up on a drum on the dock for unwinding again when the conveyor is later extended into another trailer.

The conveyor is also provided with a support which can be adjusted in height so that the device may be positioned for inclined gravity feed of boxes to be loaded even though the rear edge of the floor of the trailer is not at the exact level of the dock or always at the same level with respect to the dock level.

The structure and operation of a conveyor of the invention can be best understood by reference to the accompanying drawings showing a typical embodiment of the invention wherein:

FIG. 1 is a diagrammatic view of a conveyor of the invention extending from a dock on the right through an open rear door of a trailer which is shown in partial cross-section, showing in dotted lines certain of the parts in retracted position;

FIG. 2 is a schematic representation of distances involved in moving certain parts of the conveyor shown in FIG. 1;

FIG. 3 is a plan view, with parts broken away, of the conveyor in fully retracted position;

FIG. 4 is a side elevational view, with certain parts broken away or shown in cross-section, of the conveyor in fully retracted position;

FIG. 5 is a cross-sectional view taken along the lines 5—5 of FIG. 1; and

FIG. 6 is a cross-sectional detail taken along the line 6—6 of FIG. 5;

FIG. 1 shows the docking face of a loading dock L against which is backed a 40-foot trailer T with the rear end of its floor at the level of the platform of the dock, showing in dotted lines how the conveyor is in retracted position when the trailer is backed in the dock with the rear doors open for loading, and in full lines how the conveyor can be extended into the trailer.

The arrangement of the parts in retracted position may be best described by reference to FIGS. 3 and 4. A frame or fixed support 12 has journals 14 on which are mounted, for rotation together, a cable reel 16 and a conveyor belting drum 18.

The drum 18 functions as a storage device and accumulates in coil form wound thereon a temporarily stored portion of a flexible conveyor belting 30 formed of two parallel straps 31 and 32 (FIG. 5) which carry along their lengths a series of skate wheels 33 mounted on strap-connecting cross rods 34.

The uncoiled portion of the belting 30 extends around a pulley 36 at the upper rear corner of the fixed support 12 and then extends downwardly at a slight incline on a pivoting frame 37 which has its front supported on a fixed foot stanchion 38 provided with turnbuckle 39 adapted to pivotally raise and lower the front of the conveyor frame to adjust its height with respect to the level of the dock platform.

The inclined framework 37 accommodates telescoping portions of a series of movable supports or stanchions 40, 42, 44, 46 and 48, each of which has a roller foot 60, 62, 64, 66, 68, respectively, and a fixed anti-tilt skid 70, 72, 74, 76, and 78, respectively.

As shown in FIG. 5 the top cross bars 50 of the stanchions carry pairs of telescoping rectangular tubes 52, 54, 56, 58, 59 of diminishing cross sectional dimensions. The cross bars 50 also carry intervening telescoping round tubes 51, 53, 55, 57. The end of the larger of two telescoping round tubes has an internal annulus 51a which is located beyond an annulus 53a which surrounds the tube of lesser diameter 53 so that the two annuli being of overlapping radii act as stops against separation of the two telescoping tubes 51 and 53. Similar annuli are present at the other junctures of the sections so that the entire conveyor is held against separation of the individual sections.

Because of the progressing lesser height of the stanchions, they may be extended outwardly with each foot supporting the conveyor belting support at a lower level so as to form an overall inclined no step-down gravity conveyor, as shown in FIG. 1. where all the stanchions are shown extended on their telescoping rails except for the extreme front end stanchion 48 which is still telescoped within its adjacent supporting section and the foot 68 of which, therefore, does not reach to the floor until it is moved further into the trailer.

In FIG. 1 the stanchions are shown at the right in dotted lines all retracted against the fixed support 38.

In order that the conveyor belting may be coiled up on the drum 18 by an operator who, for example, is standing at the forward end of the conveyor, a reel 80 is mounted on the forward stanchion 48 and has an operating hand wheel 82. The secondary reel 80 is connected by a cable 84 to the primary reel 16 which is journaled on the journals 14 of the fixed support 12. Cable 84 winds up on reel 16 opposite to the direction of winding of belting 30 on drum 18.

It will be understood that the forward end of the conveyor belt 30 is fixed to the top of the foremost stanchion 48, but otherwise just lies on the telescoping rails. Accordingly, if the telescoping rails are pulled away from the dock and into the trailer, the conveyor belting 30 will uncoil from the drum 18 while the cable 84 winds up on the reel 16 and while the reel 80 pays out cable 84 not only in length sufficient to allow the drum 18 to turn, but also to allow the bodily movement of the forward stanchion away from the dock reel 16 and into the trailer.

In the retracted position of the parts shown in FIGS. 3 and 4 then, most of the cable 84 is wound up on the far end reel 80 to be paid out and wound on the dock reel 16 as the end of the conveyor belting is moved outwardly to the position shown in FIG. 1 or beyond.

When, however, the operator wishes to retract the conveyor from such advanced position or from the position shown in FIG. 1, he turns the handwheel 82 to wind up the cable 84 thereon transmitting a pull to the cable which unwinds it from the reel 16 causing the drum 18 to wind up the conveyor belting 30 which in turn will move the handwheel 82 bodily with its stanchion towards the dock so that the reel 80 will have to take up not only an amount of cable equivalent to the distance by which the conveyor belting is shortened as the reel 80 moves towards the dock but also must take up the amount of cable that is required to pull in each linear foot of belting which amount varies as the effective diameter of the coiled conveyor on the drum 18 increases because of underlying already wound convolutions.

The operaton is illustrated in FIG. 2 where the belting is shown diagrammatically at 30a the drum at 18, the primary reel at 16 and the secondary reel at 80.

In the fully extended position the working length of the conveyor is indicated as approximately $a$. When the conveyor is fully retracted, its exposed working portion is shortened by the distance $b$ of FIG. 2. Simultaneously, the reel 80 which in fully extended position is at a distance $c$ from the reel 16 has such distance shortened by a distance $d$ equal to the distance $b$.

Rotation of the reels 16 and 80 must therefore take up a length $b$ of conveyor belting 30 and a connecting length $d$ of cable 84 to move the device from fully expanded to fully retracted position and simultaneously, the reel 80 must take up, as paid out by the drum reel 16, that amount of cable 84 which is required to take up on the drum 18 a length of belting equivalent to the distance $b$.

In order that slack will not occur during these operations either in the conveyor belting 30 or in the cable 84, it is advisable to have the diameter of reel 16 almost as large as the maximum effective diameter of the fully coiled conveyor belting. In one embodiment the diameter of reel 16 was 22 inches, with a width of 1 inch; and of reel 80 was 2 ½ inches with a width of 4 inches; using 130 feet of cable and sufficient belting to permit the conveyor to extend 0–35 feet into the trailer.

When the operator extends the conveyor, it is preferred that the movable support 40 be moved away from the stanchions 38 first. This will insure that the roller foot 60 of the stanchion 40 will reach the position shown in FIG. 1 touching the trailer floor before the other stanchions 42, 44, 46 are extended. If it does not do so, it is best that the height of stanchion 38 should be adjusted until it does. By this means, a perfectly straight uniform incline can be obtained even though the truck floor is not at exactly the same level as the truck platform. If any one section is only partially extended, it will still give cantilever support.

In order that the reel 80 does not inadvertently rotate, it is provided with a brake 90 which includes a 3-ply belt strap 92 suspended from a yoke 94 telescoped into the last stanchion 48 for movement against yielding springs 96 which resiliently hold the strap 92 against a flange extension of the cable reel 80 unless the yoke is pulled outwardly to lessen the tension of the strap 92 against the flange. Such a release is effected by the operator when and if he pulls on the yoke 94 to move the stanchions into an expanded conveyor position.

There is thus provided a highly effective apparatus which can be handled by a single operator from the interior of the truck as he stacks boxes taken off the end of the conveyor, retracting the device a few feet every time the end of the conveyor becomes blocked with already stacked boxes. The conveyor can be placed into operating position with a minimum of time and effort and is always in position and available on the dock for operation as soon as a trailer has been docked.

What is claimed is:

1. A variable-length comprising flexible belting, rollers spaced lengthwise along said belting, a movable support at one end of said belting to which said one end of said belting is connected, a belting storage drum upon which the other end of said belting is wound for accumulating and storing a non-working portion of the belting while the remainder of the belting is exposed as an active working portion of said belting, rotatable reel means mounted on and bodily movable with said movable support towards and away from said storage drum to vary the length of said working portion; and elongated tension means connecting said rotatable reel means and said storage drum for causing said storage drum to take up and accumulate said belting upon rotation of said rotatable reel means to shorten the active working portion of the belting, said rotatable reel means taking up a length of said connecting means equivalent to the amount said working portion is shortened as said support moves bodily with said rotatable reel means towards said storage drum, and said belting being paid out from said storage drum and said connecting means being paid out from said rotatable reel means as said movable support is moved away from said storage drum to lengthen the active working portion of the belting.

2. A conveyor as claimed in claim 1 having a plurality of movable supports for said belting connected together telescopically for movement towards and away from said storage drum, said rotatable reel means being mounted on the movable support furthest from said drum.

3. A conveyor as claimed in claim 2 having a fixed support for said belting between said movable supports and said storage drum, said fixed support being adjustable in height.

4. A conveyor as claimed in claim 3 wherein said movable supports have different heights.

5. A conveyor as claimed in claim 2 wherein the movable supports are progressively shorter in a direction away from said storage drum.

6. A conveyor as claimed in claim 2 wherein said movable supports have roller feet.

7. A conveyor as claimed in claim 1 having a hand brake for locking said rotatable reel means against inadvertent rotation.

8. A variable-length conveyor comprising flexible belting,
skate wheels spaced lengthwise along said belting,
a movable support for one end of said belting to which said one end of said belting is connected,
a fixed support
a drum mounted on said fixed support to which drum the other end of said belting is connected for winding said other end of the belting on the drum to vary the length of the exposed working portion of the belting,
a primary cable reel fixedly mounted with respect to said drum for rotation therewith,
a secondary cable reel mounted on and bodily movable with said movable support towards and away from said fixed support, and
a cable connecting and windable off and on said reels to cause the connecting unreeled portion of said cable to lengthen or shorten and said primary reel to take up or pay out said belting from said drum as the working length of the belting is varied by movement of said movable support and secondary cable reel towards and away from said fixed support.

* * * * *

UNITED STATES PATENT OFFICE
CERTIFICATE OF CORRECTION

Patent No. 3,780,843　　　　Dated December 25, 1973

Inventor(s) Harold Joseph McGovern, Jr. and Louis Albert Granja

It is certified that error appears in the above-identified patent and that said Letters Patent are hereby corrected as shown below:

Column 4, line 18 (claim 1) after "variable-length" insert --conveyor--.

Signed and sealed this 9th day of April 1974.

(SEAL)
Attest:

EDWARD M. FLETCHER, JR.　　　　C. MARSHALL DANN
Attesting Officer　　　　　　　　Commissioner of Patents